(12) United States Patent
LaVecchia et al.

(10) Patent No.: US 8,647,180 B1
(45) Date of Patent: Feb. 11, 2014

(54) METHOD AND SYSTEM FOR OPENING SHELLFISH USING INFRARED ENERGY

(75) Inventors: Daniel P. LaVecchia, Cape May, NJ (US); Lawrence M. Handman, Cherry Hill, NJ (US)

(73) Assignee: Daniel P. LaVecchia, Cape May, NJ (US)

( * ) Notice: Subject to any disclaimer, the term of this patent is extended or adjusted under 35 U.S.C. 154(b) by 788 days.

(21) Appl. No.: 12/470,096

(22) Filed: May 21, 2009

Related U.S. Application Data (60) Provisional application No. 61/055,217, filed on May 22, 2008.

(51) Int. Cl.
*A22C 29/04* (2006.01)

(52) U.S. Cl.
USPC .............................. 452/14; 452/13

(58) Field of Classification Search
USPC ...................................... 452/12–16
See application file for complete search history.

(56) References Cited

U.S. PATENT DOCUMENTS

| | | | |
|---|---|---|---|
| 2,041,727 A | 5/1936 | Prytherch et al. | |
| 2,530,783 A | 11/1950 | Pogany | |
| 2,824,005 A | 2/1958 | Strasburger | |
| 3,007,801 A | 11/1961 | Lapeyre et al. | |
| 3,013,883 A | 12/1961 | Welcker | |
| 3,070,834 A | 1/1963 | Carpenter | |
| 3,230,580 A | 1/1966 | Marvin et al. | |
| 3,564,648 A | 2/1971 | Snow | |
| 3,566,438 A | 3/1971 | Snow | |
| 3,585,676 A | 6/1971 | Sprackin et al. | |
| 3,594,859 A * | 7/1971 | Hanks et al. | 452/14 |
| 3,614,806 A | 10/1971 | Henry | |
| 3,698,038 A * | 10/1972 | Jones, Jr. | 452/3 |
| 3,724,031 A * | 4/1973 | Sterling et al. | 452/12 |
| 3,755,855 A | 9/1973 | Ouw et al. | |
| 4,141,114 A | 2/1979 | Carlson | |
| 4,236,276 A | 12/1980 | Van Twuyner et al. | |
| 4,255,834 A | 3/1981 | Lambert | |
| 4,330,904 A | 5/1982 | Lambert | |
| 4,383,348 A | 5/1983 | Comparetto | |
| 4,420,492 A | 12/1983 | Taylor | |
| 4,532,677 A * | 8/1985 | Wenstrom et al. | 452/19 |
| 4,941,233 A * | 7/1990 | Allain | 452/4 |
| 4,951,356 A | 8/1990 | Delplanque | |
| 5,427,567 A | 6/1995 | Adcock | |
| 6,086,468 A | 7/2000 | Yoshida et al. | |
| 6,110,032 A | 8/2000 | Earnshaw | |
| 6,537,601 B1 | 3/2003 | Voisin | |
| 6,736,716 B1 | 5/2004 | Sugiyama | |
| 7,179,160 B2 * | 2/2007 | Hulin | 452/2 |

FOREIGN PATENT DOCUMENTS

WO    WO 94/00022    * 1/1994

* cited by examiner

*Primary Examiner* — David Parsley
(74) *Attorney, Agent, or Firm* — Gregory J. Winsky; Archer & Greiner, P.C.

(57) ABSTRACT

A method for shucking bi-valve shellfish, especially clams, includes imparting a wide array of infrared energy from at least one infrared heater from above to a first shell of the bi-valve shellfish sufficient to detach an adductor muscle from the first shell. The bi-valve shellfish are inverted to expose a second shell. Infrared energy is imparted again from above to a second shell of the bi-valve shellfish sufficient to release a shellfish meat from between the first and shell and the second shell. A system for carrying out this method includes a tank for washing the shellfish, a dryer, the infrared heaters, a device for inverting the shellfish, a tank for quenching the shellfish, and a conveyor for transporting the shellfish under the infrared heaters.

24 Claims, 6 Drawing Sheets

METHOD AND SYSTEM FOR OPENING SHELLFISH USING INFRARED ENERGY

FIELD OF THE INVENTION

This invention relates to separating and recovering the meat from the shell of shellfish, particularly clams, by utilizing infrared energy.

BACKGROUND OF THE INVENTION

Bi-valve shellfish (mollusks) have a two shell structure with an edible portion between the shells. Common varieties include clams, oysters, mussels, and scallops. The shells are held together by at least one adductor muscle. For instance, clams have two adductor muscles, i.e., one on either side, to keep the shells closed.

Manual means for "hand shucking" bi-valve shellfish are well known in the art. For example, a knife may be inserted in between the shells to cut the adductor muscle(s) to open and remove the edible portion from the shells. This "hand shucking" technique requires a good amount of skill and strength and is often time consuming and expensive. The use of infrared energy to open shellfish has also been disclosed.

Due to the high demand for edible portions in a raw, uncooked state, it is desirous to develop improved methods and systems for shucking (i.e., detaching each adductor muscle from its shell) bi-valve shellfish, while minimizing any cooking of the shellfish.

SUMMARY OF THE INVENTION

According to an embodiment of the present invention, a method for shucking bi-valve shellfish includes exposing a bi-valve shellfish, the bi-valve shellfish having a first side and a second side, to a wide array of infrared energy from at least one infrared heater from above on the first side of the bi-valve shellfish. The bi-valve shellfish are inverted to expose a second side. The bi-valve shellfish are then exposed to a wide array of infrared energy from at least one infrared heater from above on the second side of the bi-valve shellfish.

According to another embodiment of the present invention, a method for shucking bi-valve shellfish includes imparting energy in a wide array from at least one infrared heater from above to a first shell of a bi-valve shellfish sufficient to detach an adductor muscle from the first shell, thereby causing the first shell to open relative to a second shell. The bi-valve shellfish are inverted to expose the second shell. Infrared energy is imparted in a wide array from at least one infrared heater from above to a second shell of the bi-valve shellfish sufficient to detach an adductor muscle from the second shell, thereby releasing a shellfish meat from between the first shell and the second shell.

According to another embodiment of the present invention, a system for opening clams includes a tank for washing a plurality of clams, each of which has a first side and a second side. A surface dryer dries the clams, and a first infrared heater using a wide array of energy heats the first side of each clam from above for a sufficient period to detach the clam from its shell but insufficient to cause cooking. Clams are inverted to position the second side of each clam upward. A second infrared heater using a wide array of energy heats the second side of each clam from above for a sufficient period to detach the clam from its shell but insufficient to cause cooking. A tank for containing water or a brine solution quenches the clams. A conveyor is used to transport the clams at least under the first infrared heater and the second infrared heater.

BRIEF DESCRIPTION OF THE DRAWINGS

The invention may be understood from the following detailed description when read in connection with the accompanying drawing. Included in the drawing are the following figures.

DETAILED DESCRIPTION OF THE INVENTION

Aspects of the present invention include a method and system for shucking bi-valve shellfish. In a first embodiment of the present invention, a plurality of bi-valve shellfish, the bi-valve shellfish having a first side and a second side, are washed. The bi-valve shellfish are surface dried and exposed to a wide array of infrared energy using at least one infrared heater from above on the first side of the bi-valve shellfish. The bi-valve shellfish are inverted to expose a second side and then exposed to a wide array of infrared energy using at least one infrared heater from above on the second side of the bi-valve shellfish. The bi-valve shellfish are then quenched in a brine solution.

As discussed herein, bi-valve shellfish may be any shellfish having two hingedly connected shells, such as clams, oysters, scallops and mussels. Bi-valve shellfish by definition have two shells and for purposes of this invention have two sides where the first side is one shell and the second side is the second shell. In one embodiment, the bi-valve shellfish are clams. Clams may include different varieties of clams, such as "surf" clams or "mano" clams (also known as "steamers"). Hereafter, the bi-valve shellfish may be generally referred to as shellfish. The present invention contemplates processing a single shellfish or a plurality of shellfish. As referenced herein, the shellfish contain an edible portion or meat (housed between the two shells) which is a saleable product desired from this operation. For some markets, it is also desirous that this edible portion remains in an uncooked or raw state as is commonly known in the industry. This raw or uncooked state is comparable to the edible meat obtained by utilizing a "hand shucking" technique.

With particular emphasis on clams, traditional "hand shucking" methods employ the use of a hot dip tank. This brief immersion in hot water in the hot dip tank prior to shucking produces a slight or partial denaturing of the exterior or outermost cellular layer(s) of the clams' various anatomical parts. The majority of clams processed in this manner demonstrate a "tactile" response upon hand removal of the meats from the shells. The clams have not been significantly altered in terms of moisture or cellular fluid content. Clams run through the shucking process of the present invention similarly mirror these "hand shucking" results. For instance, the clams are not significantly altered in terms of resulting moisture content and still demonstrate "tactile" response after removal from the shell. Conversely, machine shucked or steamed clams lose in excess of 25% of their moisture content or cellular fluid and the majority do not display any "tactile" response at all. Steam or machine shucked clams are significantly altered by this invasive process and their cellular structure and thus tenderness have also been radically changed. As is known to one skilled in the art, the degree of cooking can be correlated with the remaining moisture content of the clam meat itself.

While the primary application of the present invention is to shuck bi-valve shellfish without cooking, it is also envisioned that the apparatus disclosed herewith can be used to produce cooked meat, as well as open the shellfish and separate the cooked meat from the shells. This is commonly done with a machine or steam shucking process as described above. It is contemplated in the present invention that the process disclosed may be tuned to produce a cooked edible portion which is superior in quality than the steam shucking or similar processes. For instance, the resulting meat may maintain a better moisture content (e.g., the moisture content is at least as moist as that obtainable by a steam shucking process).

Shellfish may be supplied from a number of different sources. The shellfish are delivered with most in a closed state in which the adductor muscle(s) keep the shellfish substantially closed. The temperature and cleanliness of incoming shellfish varies over a wide range depending upon ambient conditions, means of delivery, and means of harvesting. Shellfish may also vary by species or age and in size, shape, sand type, shell thickness, density of shell, edible portion size or density, frequency of broken shells, or similar features. The shellfish may arrive in or may be placed in dump cages prior to processing.

Figure 1:
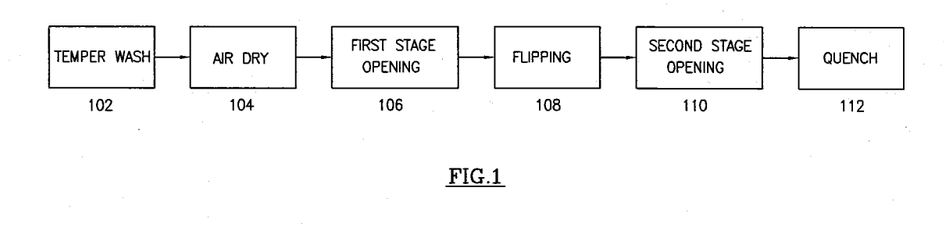
FIG. 1 is a block diagram illustrating the steps of a method for shucking bi-valve shellfish according to an embodiment of the present invention.

Referring now to FIG. 1, the steps of a first embodiment of a method for shucking bi-valve shellfish of the present invention are shown. The first step in the method is to temper wash 102 the bi-valve shellfish. The purpose of temper washing is two-fold. First, the incoming supply of shellfish may have dirt, sand, mud, or debris on the shells, and temper washing 102 provides an adequate cleaning of the shellfish. Second, the incoming supply of shellfish often arrives at varying temperatures which may be attributable to a number of factors as explained above. For example, the incoming temperatures of clams may range from about 40° F. to about 70° F. Therefore, the temper wash 102 raises the shell surface temperature of all shellfish to a substantially uniform temperature so that all shellfish will respond more similarly in downstream processing.

The temper wash 102 temperature and resulting surface shell temperature should be monitored to ensure the edible portion of the shellfish remains in a raw, uncooked state. To attain this result, the shellfish may be washed in a tank or bath of warm water or cold water, spray washed, dipped, tumble washed or washed using any suitable technique known in the art. The water may be heated within the range of about 160° F. to 200° F. The shellfish are desirably washed for about 5 seconds to one minute, and more preferably from about 10 to 40 seconds to equilibrate the outer shell temperatures. The final outer shell temperature is desirably about 140° F. but may range from 120° F. to 180° F. Alternatively, a cold water bath may also be used, which may relax the meat. It is understood that any outer shell temperature is suitable as long as the edible portion within remains in (or substantially in) the raw, uncooked state and the plurality of shells have a generally uniform temperature. It is also contemplated that the shellfish may not need to be washed at all if they enter in a state conducive to subsequent processing.

Following temper washing 102, the shellfish may be inspected and oriented on a conveyor belt. The shellfish may then be transported on a continuous conveyor belt and preferably in a single layer to a drying station 104. Surface water remaining from the temper wash 102 is physically removed from the shell using an air dry technique 104. It is desirable to only surface dry the shellfish and not to dry the shellfish to such an extent that the edible portion dries. For instance, clam juice may also be a valuable, recovered product. Any suitable drying technique known in the art may be used as long as the edible portion within remains raw and uncooked (or substantially raw and uncooked). For instance, an air knife may be used in which a high velocity (e.g., about 2500 fpm to 4000 fpm) conditioned air stream may be blown over the exterior of the shellfish. It is contemplated when gas infrared heaters are used, the heat content of the burner off gas may be used to heat the drying air. The temperatures of the air may range from non-conditioned air at ambient temperatures up to about 200° F. for conditioned air. Accordingly, the residence time where the shellfish is exposed to conditioned or non-conditioned air may be a function of a number of factors, including the conveyor speeds, the number of air drying units (area of exposure), the air temperature, the air velocity, or similar operating parameters. These factors can be varied so long as the drying is carried out to an extent sufficient to remove substantially all of the surface water from the exterior of the shells but without cooking the edible portion within. Drying the exterior shells results in reduced heating time in the subsequent infrared heating steps. The potential for cooking the edible portions is thereby greatly diminished.

The shellfish remain on the continuous conveyor belt and preferably in a single layer. The shellfish may then enter the first stage opening 106. Referring now to FIGS. 2-5, the shellfish 200 are transported on conveyor 204. In the first stage opening 106, at least one infrared heater 202 is positioned above the conveyor 204 carrying the shellfish 200. As shown in FIGS. 3 and 5, the infrared heaters 202 may traverse the width of the conveyor 204 allowing for infrared exposure to a maximum surface area of the shellfish 200 positioned on the conveyor 204. The infrared heaters emit a wide array of generally uniform energy across the width of the conveyor 204 (i.e., the infrared heaters are not focused to a particular spot on the shell of the shellfish). By using a "wide array" of infrared energy, the energy is generally evenly applied across the exposed sides of the shellfish across the width of the conveyor (or other surface the shellfish is placed on). Infrared heaters may be classified according to the wavelength emitted (e.g., near infrared, medium infrared, or far infrared). Infrared heaters may use a flame or an electrically heated filament. The present invention contemplates the use of gas fired infrared heaters with radiation centered around a wavelength of 2.7 microns operating at a temperature range of about 1200° F. to about 2200° F. It is desirable to maintain a temperature range of about 1800° F. to about 2100° F. A complete range of energy transmission may be from 0.7 to 8.5 microns with most of the energy being between 1.5 and 6.5 microns. The temperature is measured from the source.

In the first stage opening 106, the infrared heaters 202 should be positioned above the top shell 200. The infrared heaters 202 impart a wide array of infrared energy upon the shellfish below. This allows heating of the top shell only. Any shellfish meat and juices collect in the bottom of the bottom shell and are not significantly heated during this stage. It is important to heat the top shell only and not to heat from the bottom to minimize the likelihood of cooking the edible portion.

Without being bound to a particular theory, it is believed that infrared heating from beneath would cause an increased heating of the juices within the shellfish and is more likely to result in a cooked meat. By heating from above only using an infrared heater, it is believed radiation heat transfer occurs from the infrared heater to the shell and conduction occurs from the shell to the adductor muscle attachment. Microwave heating of the adductor muscle is less desirable for this type of shellfish process because it excites water molecules within the meat thus cooking the meat from the inside out. Microwave energy cannot be aimed at only the adductor muscle(s) hidden within the shells. Therefore, it is desirable to use shorter time exposure of a wide array of infrared energy to shuck the shellfish and obtain the raw, uncooked edible portion (or a substantially raw portion).

The shells should be exposed for a sufficient period to allow for opening of the shellfish by releasing the bi-valve to shell attachment and relaxing the bi-valve muscle. For instance, in one embodiment, three infrared heaters 202 may be positioned in series along the conveyor 204. The infrared heaters 202 may be positioned about 3 to 8 inches above the conveyor belt or preferably about 4 inches above the top shell. The shells 200 should be exposed for about 30 to 60 seconds, and more preferably about 40 seconds, to allow for opening and detachment of the shellfish. Infrared heaters may operate at a temperature range of about 1200° F. to about 2200° F. Conveyor speeds may range from about 2 feet per minute to about 50 feet per minute. It is contemplated that the infrared heaters may run at higher temperatures and any overcooking may be compensated for by adjusting the height or distance from the infrared heater to the top side of the shellfish. However, as expected in the art, the residence time where the shellfish is exposed to at least one infrared heater may be a function of the conveyor speeds, the number of infrared heaters and distance between them (area of exposure), the infrared wavelengths and temperatures, the distance above the shellfish that the infrared heater is positioned, or similar operating parameters. Therefore, one skilled in the art may tune these parameters as necessary to shuck the shellfish and obtain a raw, uncooked edible portion (or a substantially raw portion).

Figure 6:
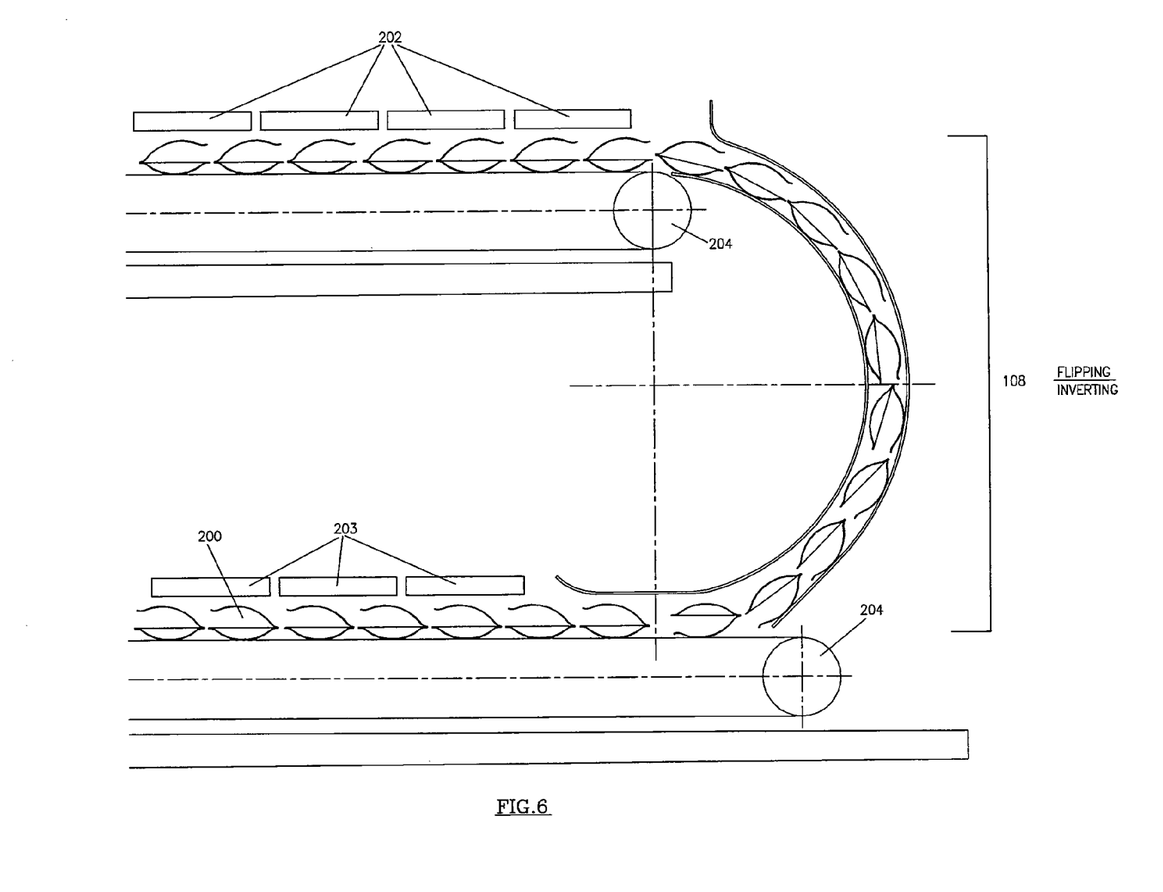
FIG. 6 illustrates a view of the production setup for automatically flipping the shellfish according to an embodiment of the present invention.

The shellfish 200 are then transported on the conveyor 204 to an inverting zone 108. The shellfish are inverted or flipped where the top shell becomes reoriented to be on the bottom and the bottom shell becomes reoriented to be on the top. More specifically, as the shellfish begins the process, the first side is oriented upwards and the second side is oriented downwards. As anticipated following exposure of the first (top) shell, the shells may have opened to some degree. Therefore, the shells oriented upward may not be substantially parallel, for instance, with the infrared heaters used in the second stage. Following inverting 108, the first side is oriented downwards and the second side is now oriented upwards. By inverting or flipping the shellfish, some of the juice within the shells may be removed and collected. Inverting may be performed automatically or may be performed by a manual operation. Manual inverting may be performed by hand with each shellfish individually flipped to orient the second side upwards as discussed above. Automatic inverting is contemplated by the conveyor transferring over a rotary drum or traveling around a curve to automatically invert each shellfish. For example, as shown in FIG. 6, following exposure under infrared heaters 202, the conveyor 204 causes the shellfish to travel around a curve in order to automatically invert the shellfish 200. The inverted shellfish are then exposed to infrared heaters 203.

The shellfish 200 ride through a semi-circle of guides (in a guided fall) to a conveyor below operating in the opposite direction. The shellfish 200 may also be guided upward, but would require a suitable mechanism to raise the shellfish to the conveyor above. Automatic inverting may be performed by any other techniques well known in the art.

In the second stage opening 110, the infrared heaters 203 should be positioned above the top shell 200. This again allows heating of the top shell only (e.g., the second side). Any shellfish meat and remaining juices collect in the bottom of the bottom shell and are not significantly heated during this stage. Similar to the first stage opening 106, in the second stage opening 110, the infrared heaters 203 impart a wide array of infrared energy from at least one infrared heater upon the shellfish below. By "wide array", it is understood that the infrared energy is not focused on any particular area of the shellfish, but is generally applied evenly across the area where the shellfish are positioned (e.g., on the portion of conveyor traveling beneath the infrared heaters). This allows heating of the top shell only. Similar to the discussion in the first stage opening 106, it is important to heat the top shell only and not to heat from the bottom to minimize the likelihood of cooking the edible portion.

The shells should be exposed for a sufficient period to allow for detaching the shellfish meat from the shell thereby facilitating removal of the edible meat from the shell. A sufficient period of exposure may include: (1) opening of the shellfish, e.g., by releasing a bi-valve to shell attachment; (2) completely detaching a adductor muscle from the shell; or (3) weakening the attachment, e.g., a partial detachment. For shellfish with more than one adductor muscle, detachment may be for one or both of the adductor muscles. As used herein, "detachment" or "detaching" is understood to include complete detachment where the adductor muscle is no longer connected to the shell and/or the meat and partial detachment where the adductor muscle is still connected to the shell and/or the meat but is in a weakened state. A partial detachment may allow for removal of the edible meat without tools or it may be removed with tools, but with no difficulty in removing the edible portion.

For instance, in one embodiment, three infrared heaters 203 may be positioned in series along the conveyor 204. The infrared heaters 203 may be positioned about 4 to 8 inches above the conveyor belt 204 or preferably about 4 inches above the top shell. The shells 200 should be exposed for about 20 to 80 seconds, and more preferably about 40 seconds, to allow for further opening and detachment of the meat from the shell in the shellfish. As described, the exposure duration in the second stage may be less than the exposure imparted in the first stage. As expected in the art, the residence time where the shellfish is exposed to at least one infrared heater may be a function of the conditions in first stage opening, the conveyor speeds, the number of infrared heaters and distance between them (area of exposure), the infrared wavelengths or temperatures, the distance above the shellfish the infrared heater is positioned, or similar operating parameters. Therefore, one skilled in the art may tune these parameters as necessary to shuck the shellfish and obtain a raw, uncooked edible portion. An embodiment of this invention uses the same infrared heaters in the first and second stage, but different infrared heaters may be utilized in the different stages with different operating parameters to obtain the same result. While three or four infrared heaters are shown in embodiments of the present invention, any number or configuration of infrared heaters may be used as long as a wide array of infrared energy is imparted on the shellfish.

Quality inspections may be performed at any time during the process. In particular, quality inspections should be performed to monitor the state of the shellfish following infrared exposure. It is preferable to "undercook" the shellfish or tend towards most of the shellfish remaining in an uncooked state where any unopened shellfish may be "hand shucked" offline. Following processing, if any shellfish emerge in a cooked state, the cooked shellfish may be separated from the raw, uncooked portions and sold as cooked shellfish. Preferably, all of the shellfish are uncooked. Alternatively, substantially all (i.e., at least 80%, preferably 90%, more preferably 95%, and most preferably 99%) are uncooked. It is contemplated, as discussed above, that the process disclosed herein may be tuned to produce a cooked edible portion that is superior in quality than a steam shucking or similar processes. It is commercially viable to produce cooked meat or edible portions.

The opened shellfish may be discharged from the conveyor belt 204 into a quenching tank 112. A quenched water and/or brine solution in a brine settling tank is typically employed in current shellfish processing. The quenching step causes the edible, meat portion to be gravity separated from the shells where the meat will float to the top and the shells sink to the bottom in the brine settling tank. As is well-known, the density of the brine solution is selected to achieve this separation. Typically, a chilled brine solution is used to cool the meat and maintain the raw, uncooked state. The chilled brine solution may be at a temperature about 30° F. to about 50° F., but any suitable temperature and technique may be used which is available in the art. Alternatively, the shellfish may be spray cooled instead of quenched. Other methods of meat separation may also be used such as hand separation, laminar flow separators, or mechanical hammers, all of which are well known in the industry.

Aspects of the present invention include a method for shucking bi-valve shellfish by imparting energy in a wide array from at least one infrared heater from above to a first shell of a bi-valve shellfish sufficient to detach an adductor muscle from the first shell, thereby causing the first shell to open. The bi-valve shellfish are inverted to expose a second shell. Infrared energy is imparted in a wide array from at least one infrared heater from above to a second shell of the bi-valve shellfish sufficient to detach an adductor muscle from the second shell, thereby causing the second shell to open.

Figure 2:
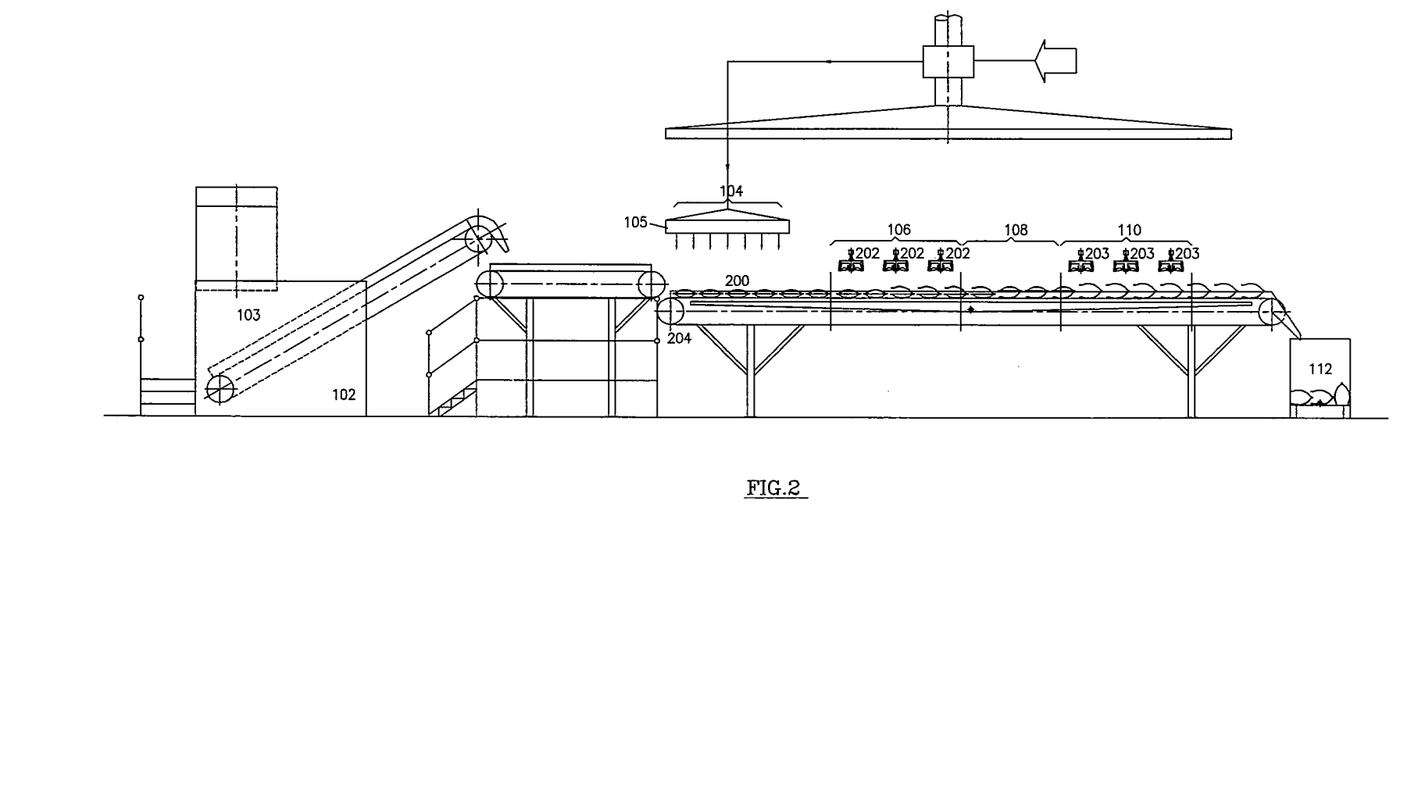
FIG. 2 illustrates a schematic side elevation view of a production setup for conveying bi-valve shellfish beneath infrared heaters according to an embodiment of the present invention.
Figure 3:
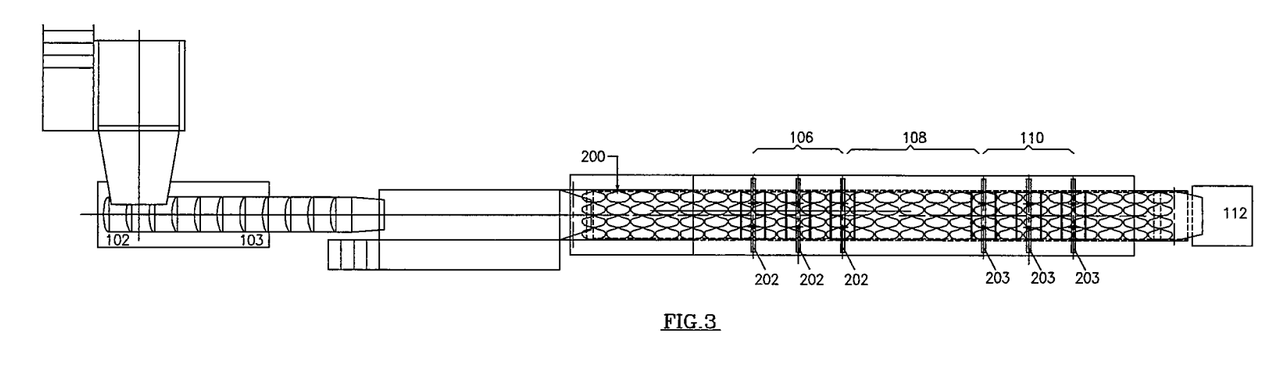
FIG. 3 illustrates a top plan view of the production setup of the embodiment of the present invention shown in FIG. 2.

In one embodiment of the invention, FIGS. 2 and 3 show the shellfish 200 transported on conveyor 204. The shellfish 200 are transported beneath the infrared heaters 202 in the first opening stage 106. The shellfish 200 are flipped in the inverting stage 108. The shellfish 200 are transported beneath the infrared heaters 203 in the second opening stage 110. Finally, the shellfish 200 are quenched in a brine solution in the quenching stage 112.

Figure 4:
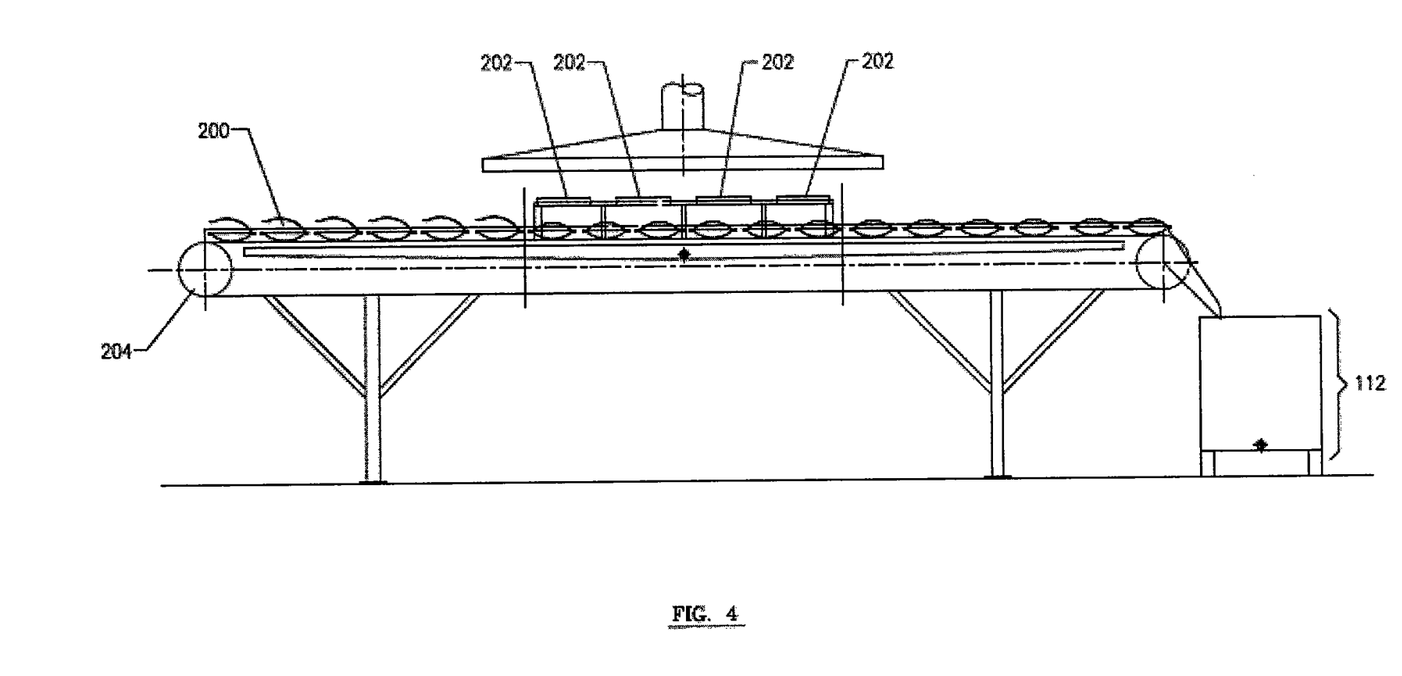
FIG. 4 illustrates another schematic side view of a production setup for conveying bi-valve shellfish utilizing infrared heaters from above according to another embodiment of the present invention.
Figure 5:
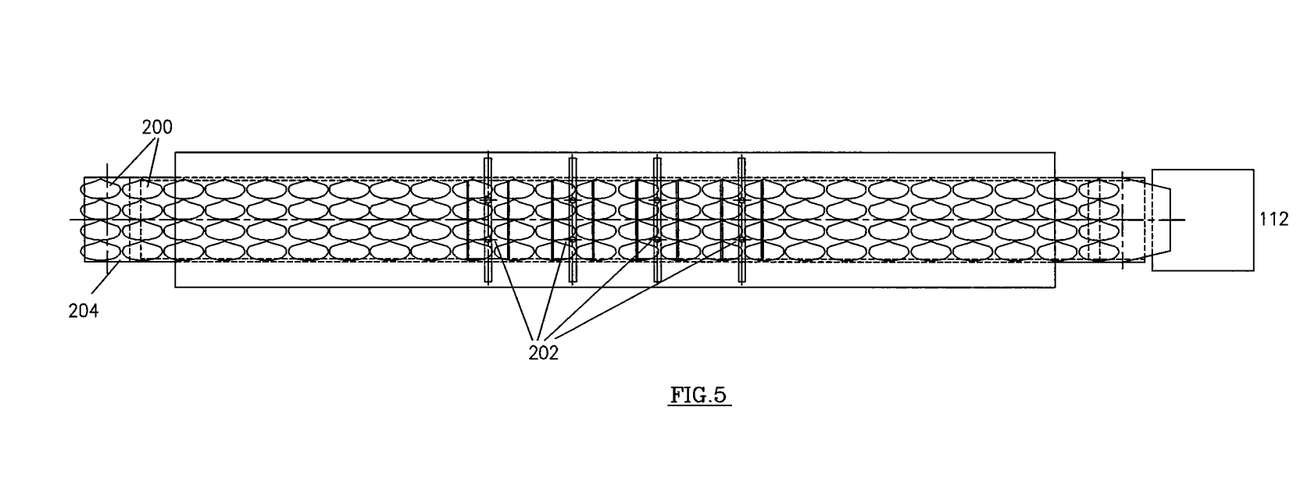
FIG. 5 illustrates a top plan view of the production setup of the embodiment of the present invention shown in FIG. 4.

In an alternative embodiment of the invention, FIGS. 4 and 5 show the shellfish 200 transported on conveyor 204. The shellfish are transported beneath the infrared heaters 202 and the shellfish are quenched in a brine solution in the quenching stage 112. Therefore, the shellfish may be recovered after emerging from the first stage opening 106 (or recovered from the quenching tank) and placed on the same processing line for second stage opening 110. In a small scale commercial operation, for example in a restaurant, a single clam may be placed under a burner, the clam is then inverted exposing the second side, and then placed under the burner again. The meat may be separated or removed from the shells, washed, and served. In another embodiment, the shellfish may be placed on a conveyor, moved under at least one burner, reversed back from under the burner, manually flipped, moved back under the at least one burner, and reversed back from under the burner. The uncooked, edible portion may then be removed and served.

The figures and embodiments illustrate use of a conveyor belt 204 to transport the shellfish through different stages of the process (particularly the infrared heating and inverting stages). The conveyor should be selected as to allow juice and debris to fall through, is able to withstand the infrared temperatures and conditions, and should not absorb too much heat so as to not heat the shellfish from below. However, it should be understood that any appropriate system known in the art may be employed in either conveying the shellfish or moving the infrared heaters over the shellfish in a manner consistent with the scope of the invention. Preferably, a pan extending below the conveyor catches the clam juice.

Aspects of the present invention include a system for opening claims 200. The system includes a tank 103 for washing a plurality of clams where each clam has a first and second side. A dryer 105 dries the surface of the clam shells and an infrared heater 202 heats the first side of each clam from above for a sufficient period to detach the clam from its shell but insufficient to cause cooking. Clams are inverted 108 to position the second side of each clam upward. An infrared heater 203 heats the second side of each clam from above for a sufficient period to detach the clam from its shell but insufficient to cause cooking. A tank 112 quenches the clams in a brine solution.

EXAMPLES

Example 1

Clams were processed in the following trials. Three infrared burners were operated in zone 1 (first stage opening 106) and three infrared burners were operated in zone 2 (second stage opening 110). Gas fired infrared burners by Red-Ray Manufacturing, Inc., of Branchburg, N.J. were used (model type KN-SS-SC). Each zone was approximately 26 inches long with burners on 10 inches centers, approximately, and each burner was approximately 4 inches wide. All burners were positioned 6 inches above the conveyor. Radiation was centered around a wavelength of 2.7 microns and operated at a temperature range of about 1800° F. to about 2200° F. The exact temperature was not measurable by a pyrometer because the exact temperature varies within the above cited range. The conveyor was traveling at speeds ranging between 2.84 to 3.43 fpm (feet per minute). Following processing, the surface of the meat was measured with an optical pyrometer ("MID TEMP" in degrees Fahrenheit) and the center of the tongue was measured with a thermocouple ("FINAL TEMP" in degrees Fahrenheit). Under "MEAT RELEASE", Y indicates complete release from both shells, 1 shell indicates release from one shell, and N indicates no release. Under "MEAT COOKED", N indicates the meat was not cooked and remained in the raw, uncooked state.

In the following run, the clams were not temper washed. The conveyor speed was 2.84 fpm.

TABLE 1

| | No Temper Wash | | | |
|---|---|---|---|---|
| CLAM | MID TEMP DEG F. | FINAL TEMP DEG F. | MEAT RELEASE (Y/N) | MEAT COOKED (Y/N) |
| 1 | 143 | 80 | Y | N |
| 2 | 95 | 66 | Y | N |

TABLE 1-continued

| | | No Temper Wash | | |
|---|---|---|---|---|
| CLAM | MID TEMP DEG F. | FINAL TEMP DEG F. | MEAT RELEASE (Y/N) | MEAT COOKED (Y/N) |
| 3 | 144 | 87 | Y | N |
| 4 | 94 | 73 | Y | N |
| 5 | 204 | 77 | 1 SHELL | N |

In the following run, the clams were not temper washed. The conveyor speed was 3.12 fpm.

TABLE 2

| | | No Temper Wash | | |
|---|---|---|---|---|
| CLAM | MID TEMP DEG F. | FINAL TEMP DEG F. | MEAT RELEASE (Y/N) | MEAT COOKED (Y/N) |
| 1 | 100 | 54 | 1 SHELL | N |
| 2 | 144 | 74 | Y | N |
| 3 | 116 | 62 | Y | N |
| 4 | 122 | 69 | Y | N |
| 5 | 139 | 68 | 1 SHELL | N |

In the following run, the clams were temper washed. The conveyor speed was 3.43 fpm.

TABLE 3

| | | Temper Wash | | |
|---|---|---|---|---|
| CLAM | MID TEMP DEG F. | FINAL TEMP DEG F. | MEAT RELEASE (Y/N) | MEAT COOKED (Y/N) |
| 1 | 158 | 62 | 1 SHELL | N |
| 2 | 98 | 75 | Y | N |
| 3 | 118 | 77 | Y | N |
| 4 | 129 | 77 | Y | N |
| 5 | 129 | 77 | 1 SHELL | N |

As is demonstrated in the above examples, the clams processed under the above conditions resulted in sufficient detachment from one or both shells and produced raw, uncooked, edible clam meat as desired.

Example 2

Mano and surf clams were processed in the following trials. Surf clams are typically about 4 to 5 inches long, 2 to 3 inches wide, and 1.5 to 2 inches deep. Mano clams are typically about 2.5 to 3 inches long, about 2 inches wide, and about 1 inch deep. Three belt speeds were tested corresponding to three different residence times under the burners. The residence times ranged from about 30 to 35 seconds under each of the two zones (first and second sides) for about 60 to 70 seconds total time under the burners. Each zone was approximately 26 inches long with burners on 10 inch centers. Each burner is about 4 inches wide. There are three burners in each zone. The burner height was about 4 to 5.5 inches above the conveyor. Radiation from the infrared burners was centered around a wavelength of 2.7 microns and operated at a temperature range of about 1800° F. to about 2200° F.

The mano clams may be temper washed according one of the following: (1) 20 seconds in a bath at 170° F.; (2) a cold wash; or (3) 20 seconds in a bath at 170° F. followed by a two minute ambient air cooling to allow the clams to relax. The temper wash followed by the air cooling step yielded the most consistent results.

TABLE 4

| | Temper Wash | | |
|---|---|---|---|
| Temper wash | Residence time in zones 1 and 2 | Results | Meat Acceptable |
| 20 seconds 170° F. bath | 30.5 | One muscle on side released | Y |
| 20 seconds 170° F. bath | 34.2 | Meat can be easily removed manually | Y |
| None | 34.2 | NOT flipped - meat overcooked | N |
| 20 seconds 170° F. bath Cool for 2 minutes | 31.5 | Meat can be easily removed manually | Y |

10 mano clams were processed for each of the specified temper wash conditions and the residence times shown. The residence times were in seconds for each of the zones, e.g., 30.5 seconds in through zone 1 and 30.5 seconds through zone 2. The burners were 5.5 inches above the conveyor. All 10 mano clams for each of the tests exhibited the described results. When the shellfish were flipped between zones 1 and 2 and run under the above conditions, the meat could be easily removed manually without the need for traditional clam shucking techniques. For the clams which were not flipped between zones 1 and 2, however, the clams were overcooked, i.e., the meat was found unacceptable.

Following processing, the shell and surface of the meat was measured with an optical pyrometer and the center of the tongue was measured with a thermocouple. All temperatures were recorded in degrees Fahrenheit. Under "MEAT RELEASE", Y indicates complete release from both shells, first side only indicates release from the first shell, and N indicates no release. Under "MEAT ACCEPTABLE", Y indicates the meat was not cooked and remained in the raw, uncooked state. The meat was deemed acceptable if it remained tactile and moist.

TABLE 5

| | Mano Clam Results | | | | | | |
|---|---|---|---|---|---|---|---|
| TEMPER WASH | SHELL START TEMP | SHELL MID TEMP | SHELL FINAL TEMP | MEAT EXIT TEMP | MEAT RELEASE | MEAT ACCEPTABLE | BURNERS |
| Y | 122 | 550 | 390 | 202 | Y | Y | 1-6 |
| Y | 144 | 470 | 350 | n/a |   | N | 1-6 |
| Y | 156 | 410 | 420 | 167 | Y | Y | 1, 2, 4, 5 |
| Y | 128 | 433 | 330 | 142 | N | Y | 1, 2, 4, 5 |
| Y | 138 | 330 | 240 | 170 | Y | Y | 1, 2, 4, 5 |
| Y | 115 | 330 | 200 | 140 | N | Y | 1, 2, 4, 5 |

A single mano clam was processed for each of these runs. The clams were temper washed. The residence time under each of the zones was 30.3 seconds. The burner temperatures measured 1800-1900° F. Zone one included burners 1-3 and zone two included burners 4-6. Thus, when clams were processed under only burners 1, 2, 4, and 5, the meat was acceptable, but meat release did not always occur.

TABLE 6

Surf Clam Results

| CLAM WEIGHT (g) | TEMPER WASH | SHELL START TEMP | SHELL MID TEMP | SHELL FINAL TEMP | MEAT EXIT TEMP | MEAT RELEASE | MEAT ACCEPTABLE |
|---|---|---|---|---|---|---|---|
| 461.2 | Y | 170 | 360 | 341 | 219 | Y | Y |
| 454.7 | Y | 138 | 330 | 375 | 211 | first side only | N |
| 443.7 | Y | 165 | 436 | 300 | 242 | Y | Y |
| 712.7 | Y | 166 | 410 | 350 | 225 | first side only | |
| 545.7 | N | 67 | 300 | 244 | 241 | first side only | Y |
| 594.0 | N | 65 | 320 | 245 | 216 | first side only | Y |
| 485.4 | Y | 120 | 380 | 234 | 265 | Y | Y |
| 536.7 | Y | 148 | 345 | 350 | 241 | Y | Y |
| 557.3 | Y | 140 | 330 | 305 | 180 | first side only | Y |
| 684.2 | Y | 101 | 280 | 230 | n/a | first side only | |
| 593.7 | Y | 121 | 329 | 264 | 232 | first side only | Y |

A single surf clam was processed in each of these runs. The residence time under each of the zones was 30.3 seconds. The burners were 5 inches above the conveyor. The test results showed that the shell measured temperature is not a good predictor of acceptable meat quality or for obtaining meat release from the shell. While many of the runs only exhibited release on the first side, the meat could be easily removed without the use of a knife or any hand shucking techniques.

As was observed throughout the above examples, the clams processed under many of the above conditions resulted in sufficient detachment from at least one shell and many times both shells and produced raw, uncooked, edible clam meat as desired. In the cases of release from one shell, the meat could be easily removed manually without the need for traditional clam shucking techniques. Thus, as observed using the conditions described, greater than 80% of the clams opened (typically in the range of 80 to 90%) and resulted in acceptable meat product. In view of this data, a person of skill in the art would be able to adjust the variables to achieve greater than 80% opening and/or release while maintaining the meat in an uncooked state. Variables may includes, for example, temper washing, air dry, residence time conditions, such as conveyor speeds, the number of infrared heaters and distance between them (area of exposure), the infrared wavelengths and temperatures, the distance above the shellfish that the infrared heater is positioned, and other similar operating parameters and conditions.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for shucking bi-valve shellfish comprising:
   (a) exposing the first side of a bi-valve shellfish, the bi-valve shellfish having a first side and a second side, to a wide array of infrared energy from at least one infrared heater from above;
   (b) inverting the bi-valve shellfish to expose the second side; and
   (c) exposing the second side of the bi-valve shellfish to a wide array of infrared energy from at least one infrared heater from above,
   wherein the bi-valve shellfish is heated by the at least one infrared heater only from above the shellfish and the bi-valve shellfish is not heated from below during the entire method.

2. The method of claim 1, further comprising, before step (a), washing the bi-valve shellfish, wherein the washing step comprises temper washing the bi-valve shellfish to produce a substantially uniform shellfish surface temperature.

3. The method of claim 2, wherein the washing step comprises placing the bi-valve shellfish in a water bath at a temperature of about 160° F. to 200° F. for a duration of about 5 seconds to 1 minute.

4. The method of claim 2 further comprising, after the washing step, surface drying the bi-valve shellfish.

5. The method of claim 4, wherein the drying step comprises exposing the bi-valve shellfish to an air knife.

6. The method of claim 4, wherein the drying step comprises exposing the bi-valve shellfish to air at a temperature of about 120° F. to 180° F. for a duration of about 10 seconds to 30 seconds.

7. The method of claim 1, wherein the bi-valve shellfish are transported on a conveyor in a single layer in step (a) and step (c).

8. The method of claim 1, wherein the at least one infrared heater in step (a) operates in an infrared wavelength centered at about 2.7 microns.

9. The method of claim 1, wherein the at least one infrared heater in step (c) operates in an infrared wavelength centered at about 2.7 microns.

10. The method of claim 1, wherein the at least one infrared heater in step (a) is located about three to eight inches above the bi-valve shellfish and operates at a temperature of about 1200° F. to 2000° F., wherein step (a) is carried out for a duration of about 30 seconds to 60 seconds.

11. The method of claim 1, wherein the at least one infrared heater in step (c) is located about three to eight inches above the bi-valve shellfish and operates at a temperature of about 1200° F. to 2000° F., wherein step (c) is carried out for a duration of about 20 seconds to 40 seconds.

12. The method of claim 1, wherein the inverting step comprises flipping by a manual technique.

13. The method of claim 1, wherein the inverting step comprises flipping by an automatic technique.

14. The method of claim 13, wherein the automatic flipping technique comprises transporting the bi-valve shellfish around a curve.

15. The method of claim 1 further comprising, after step (c), quenching the bi-valve shellfish.

16. The method of claim 15, wherein the quenching step comprises placing the bi-valve shellfish in a brine solution which is at a temperature of about 30° F. to 50° F.

17. The method of claim 1, wherein the bi-valve shellfish is selected from the group consisting of clams, scallops, mussels, and oysters.

18. The method of claim 1, wherein the bi-valve shellfish are clams.

19. The method of claim 15, wherein upon quenching the bi-valve shellfish, the meat of the shellfish separate from the shells of the shellfish by floating to a surface, and the method further comprises collecting the meat of the bi-valve shellfish.

20. A method for shucking bi-valve shellfish comprising:
(a) imparting energy in a wide array from at least one infrared heater from above to a first shell of a bi-valve shellfish sufficient to detach an adductor muscle from the first shell thereby causing the first shell to open relative to a second shell;
(b) inverting the bi-valve shellfish to expose the second shell;
(c) imparting energy in a wide array from at least one infrared heater from above to a second shell of the bi-valve shellfish sufficient to detach an adductor muscle from the second shell thereby releasing a shellfish meat from between the first shell and the second shell, wherein the bi-valve shellfish is heated by the at least one infrared heater only from above the shellfish and the bi-valve shellfish is not heated from below during the entire method.

21. A system for opening clams comprising:
(a) a tank for washing a plurality of clams, each clam having a first side and a second side;
(b) a dryer for surface drying the clams;
(c) a first infrared heater using a wide array of energy for heating the first side of each clam from above for a sufficient period to cause the first side to open relative to the second side but insufficient to cause cooking;
(d) means for inverting the clams to position the second side of each clam upward;
(e) a second infrared heater using a wide array of energy for heating the second side of each clam from above for a sufficient period to detach the clam from its shell but insufficient to cause cooking, wherein a heater is not provided below the clams;
(f) a tank for quenching the clams; and
(g) a conveyor for transporting the clams under the first infrared heater and the second infrared heater,
wherein the clams are heated by the first infrared heater and the second infrared heater only from above the clams and the clams are not heated from below throughout the entire system.

22. The system of claim 21, wherein each of the first infrared heater and the second infrared heater comprises three infrared heaters.

23. The system of claim 21, wherein the first infrared heater in (c) is located about three to eight inches above the clams and operates in a temperature of about 1200° F. to 2000° F., wherein step (c) is carried out for a duration of about 30 seconds to 60 seconds.

24. The system of claim 21, wherein the second infrared heater in (e) is located about three to eight inches above the clams and operates in a temperature of about 1200° F. to 2000° F., wherein step (e) is carried out for a duration of about 20 seconds to 40 seconds.

\* \* \* \* \*